United States Patent
Lin

(10) Patent No.: US 8,074,323 B2
(45) Date of Patent: Dec. 13, 2011

(54) INVERTED-TYPE HINGE AND A PORTABLE ELECTRONIC DEVICE

(75) Inventor: Shu-Mu Lin, Shulin (TW)

(73) Assignee: Shin Zu Shing Co., Ltd., New Taipei (TW)

( * ) Notice: Subject to any disclaimer, the term of this patent is extended or adjusted under 35 U.S.C. 154(b) by 354 days.

(21) Appl. No.: 12/534,113

(22) Filed: Aug. 1, 2009

(65) Prior Publication Data

US 2011/0026195 A1 Feb. 3, 2011

(51) Int. Cl.
*G06F 1/16* (2006.01)

(52) U.S. Cl. ............ 16/345; 361/679.27; 361/679.55; 361/679.56; 16/352; 455/575.1; 455/575.4; 379/433.13; 248/917; 248/920

(58) Field of Classification Search .............. 361/679.27
See application file for complete search history.

(56) References Cited

U.S. PATENT DOCUMENTS

| | | | |
|---|---|---|---|
| 4,960,256 A * | 10/1990 | Chihara et al. ............. 248/286.1 |
| 7,130,186 B2 * | 10/2006 | Yu ............................. 361/679.27 |
| 7,821,783 B2 * | 10/2010 | Wang et al. ............... 361/679.27 |
| 7,903,400 B1 * | 3/2011 | Chen et al. ................ 361/679.27 |
| 7,917,993 B2 * | 4/2011 | Park .............................. 16/239 |
| 2006/0250761 A1 * | 11/2006 | Tsai et al. ...................... 361/681 |
| 2007/0159783 A1 * | 7/2007 | Chen et al. .................... 361/683 |
| 2010/0226089 A1 * | 9/2010 | Wang et al. ............... 361/679.55 |

* cited by examiner

*Primary Examiner* — Jinhee Lee
*Assistant Examiner* — Anthony Q Edwards
(74) *Attorney, Agent, or Firm* — Pai Patent & Trademark Law Firm; Chao-Chang David Pai

(57) ABSTRACT

A portable electronic device with an inverted-type hinge has a cover connected to a stationary bracket, a side shell connected to a tilting assembly, a cover connected to an inverting assembly and a sliding assembly being eccentric to a tilting shaft. With cooperation between the inverting assembly and the tilting assembly, the cover may be inverted to reveal a display that leans against the base. Therefore, the user easily touches the display without pivoting the cover. Furthermore, the sliding assembly lifts the cover while the cover is opened relative to the base to prevent the cover from impacting the base.

14 Claims, 9 Drawing Sheets

US 8,074,323 B2

INVERTED-TYPE HINGE AND A PORTABLE ELECTRONIC DEVICE

BACKGROUND OF THE INVENTION

1. Field of the Invention

The present invention relates to an inverted-type hinge, especially to an inverted-type hinge mounted between a cover and a base of a portable electronic device to provide pivoting and tilting.

2. Description of the Prior Arts

With the variation of the life style, portable electronic devices such as notebook computers and cell phones are indispensable to modern people. Further due to continual progress of technology, touch panels have become standard units for portable electronic device. Especially for some conditions such as playing games and showing data, users only need the touch panel as both an input interface and an output interface. However, a conventional hinge provides a cover of a portable electronic device to tilt at a certain angle. When the user touches the touch panel on the tilted cover, the cover is easily pivoted because of stress from the user. Therefore, the conventional hinge is not convenient for user to use the touch panel on the cover.

To overcome the shortcomings, the present invention provides an inverted-type hinge to mitigate or obviate the aforementioned problems.

SUMMARY OF THE INVENTION

The main objective of the present invention is to provide an inverted-type hinge and its portable electronic device. The portable electronic device has a cover connected to a stationary bracket, a side shell connected to a tilting assembly, a cover connected to an inverting assembly and a sliding assembly eccentric to a tilting shaft. With cooperation between the inverting assembly and the tilting assembly, the cover may be inverted to reveal a display and leans against the base. Therefore, the user easily touches the display without pivoting the cover. Furthermore, the sliding assembly lifts the cover while the cover is opened relative to the base to keep the cover from impacting the base.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
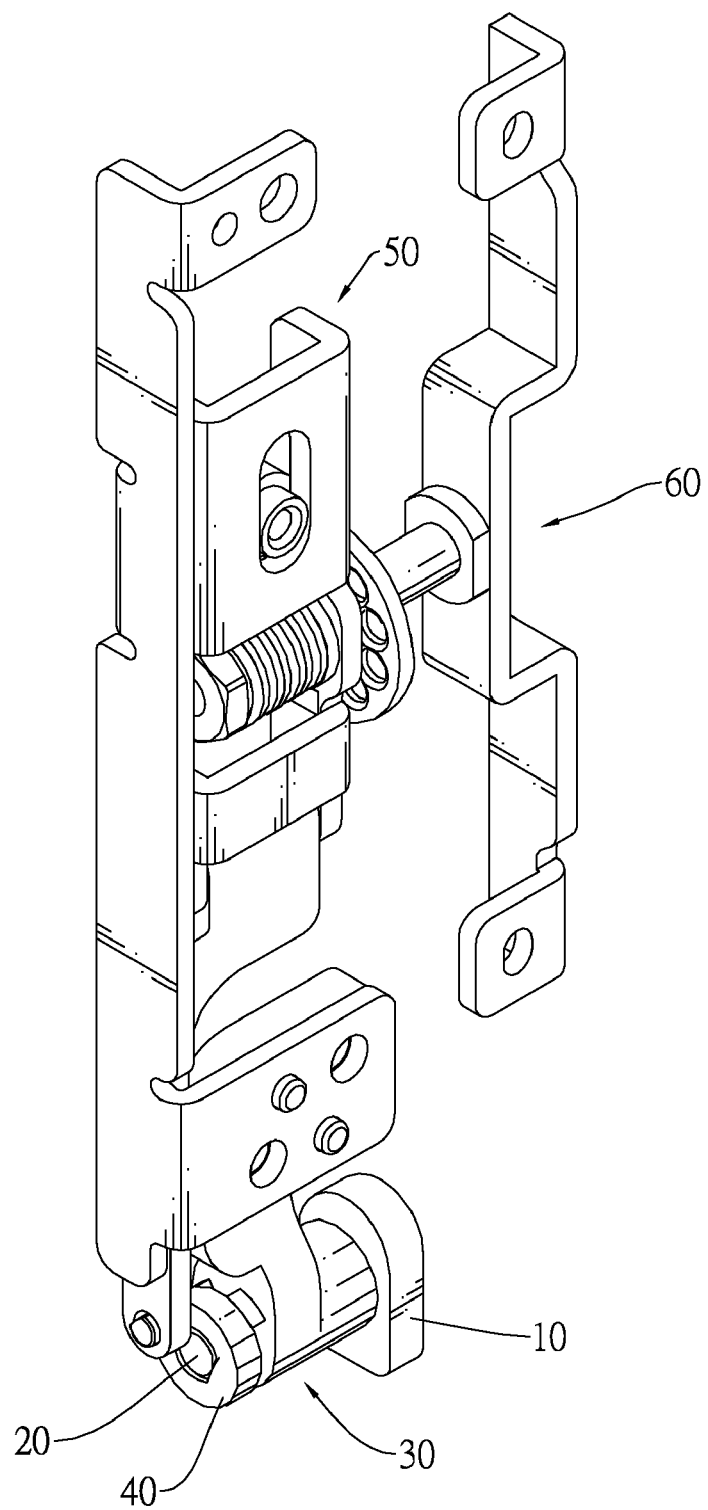
FIG. 1 is a perspective view of an inverted-type hinge in accordance with the present invention.

With reference to FIG. 1, an inverted-type hinge in accordance with the present invention comprises a stationary bracket (10), a tilting shaft (20), a tilting assembly (30), a limiting washer (40), a sliding assembly (50) and an inverting assembly (60).

The tilting shaft (20) is mounted securely through the stationary bracket (10) and has a non-circular end.

Figure 2:
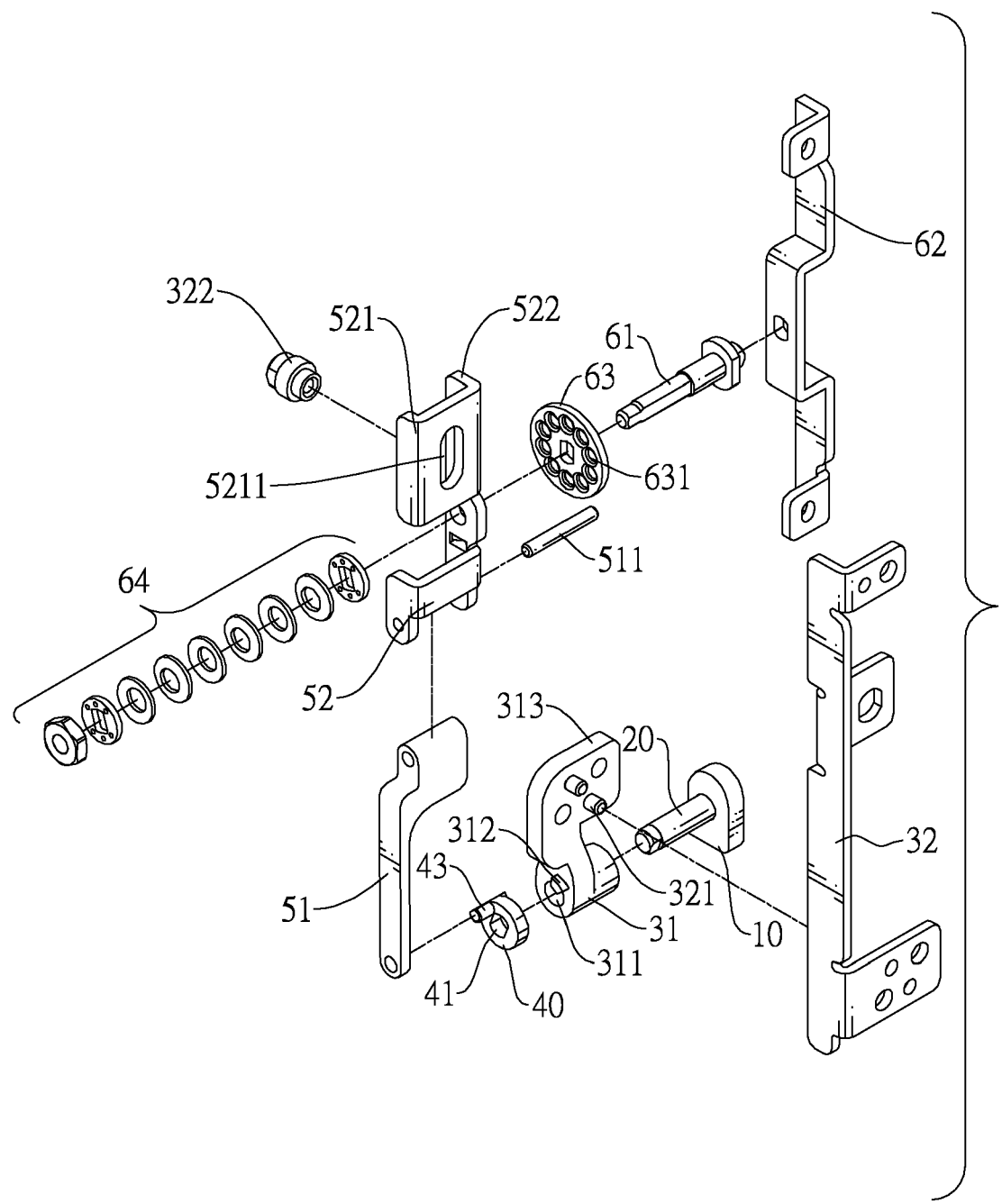
FIG. 2 is an exploded perspective view of the inverted-type hinge in FIG. 1.

With reference to FIG. 2, the tilting assembly (30) is connected to the tilting shaft (20) and has a tilting sleeve (31) and a tilting bracket (32). The tilting sleeve (31) is mounted rotatably around the tilting shaft (20) via a central hole (311) and has a limit (312) and a connecting part (313). The limit (312) is formed longitudinally on and protrudes from a distal end of the tilting sleeve (31). The connecting part (313) is formed transversely on and protrudes from an outside wall of the tilting sleeve (31). The tilting bracket (32) is attached securely to the connecting part (313) of the tilting sleeve (31) via at least one fastener (321). A sliding pin (322) is attached surely to the tilting bracket (32).

Figure 3:
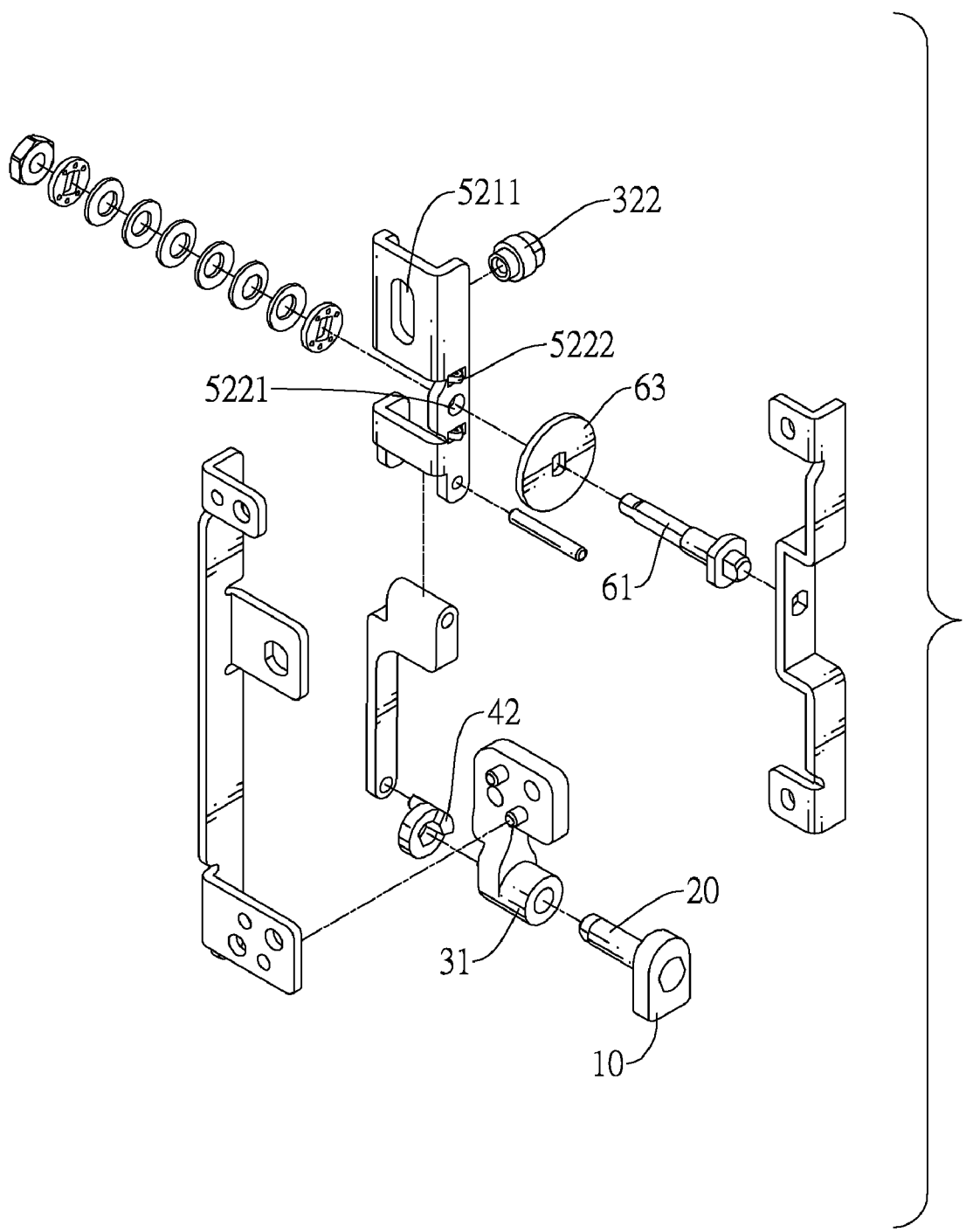
FIG. 3 is another exploded perspective view of the inverted-type hinge in FIG. 1.

With reference to FIGS. 2 and 3, the limiting washer (40) is mounted securely around the tilting shaft (20) via a central hole (41) and is adjacent to the distal end of the tilting sleeve (31). The central hole (41) of the limiting washer (40) may be circular or may be non-circular to engage the non-circular end of the tilting shaft (20). The limiting washer (40) has a stop (42) and a connecting protrusion (43). The stop (42) is formed longitudinally on and protrudes from a proximal side of the limiting washer (40) and selectively abuts the limit (312) of the tilting sleeve (31). The connecting protrusion (43) is formed longitudinally on and protrudes from a distal side of the limiting washer (40) and is eccentric to the tilting shaft (20).

The sliding assembly (50) is connected to the limiting washer (40) and has a connecting bracket (51) and a sliding bracket (52). The connecting bracket (51) abuts the tilting bracket (32) and has a connecting end and a mounting end. The connecting end of the connecting bracket (51) is mounted rotatably around the connecting protrusion (43) of the limiting washer (40). The sliding bracket (52) is attached securely to the mounting end of the connecting bracket (51) via a fastening pin (511) and has a sliding wing (521) and a mounting wing (522). The sliding wing (521) and the mounting wing (522) are connected to each other. The sliding wing (521) has an elongated slot (5211). The elongated slot (5211) is mounted slidably around the sliding pin (322) so that the sliding wing (521) is movable up and down relative to the tilting bracket (32). The mounting wing (522) has a through hole (5221) and two resilient protrusions (5222). The resilient protrusions (5222) are opposite to each other, protrude out from the mounting wing (522) and are formed adjacent to the through hole (5221).

The inverting assembly (60) is connected to the mounting wing (522) of the sliding assembly (50) and comprises an inverting shaft (61), an inverting bracket (62), a positioning washer (63) and a washer assembly (64). The inverting shaft (61) is mounted rotatably through the through hole (5221) of the mounting wing (522). The inverting bracket (62) is mounted securely around the inverting shaft (61). The positioning washer (63) is mounted around and is rotated simultaneously with the inverting shaft (61) and is mounted adjacent to the resilient protrusions (5222) of the mounting wing (522). The positioning washer (63) has multiple positioning detents (631) selectively engaging the resilient protrusions (5222) of the mounting wing (522). The washer assembly (64) is mounted around the inverting shaft (61) and has multiple washers to provide limiting function and friction.

Figure 4:
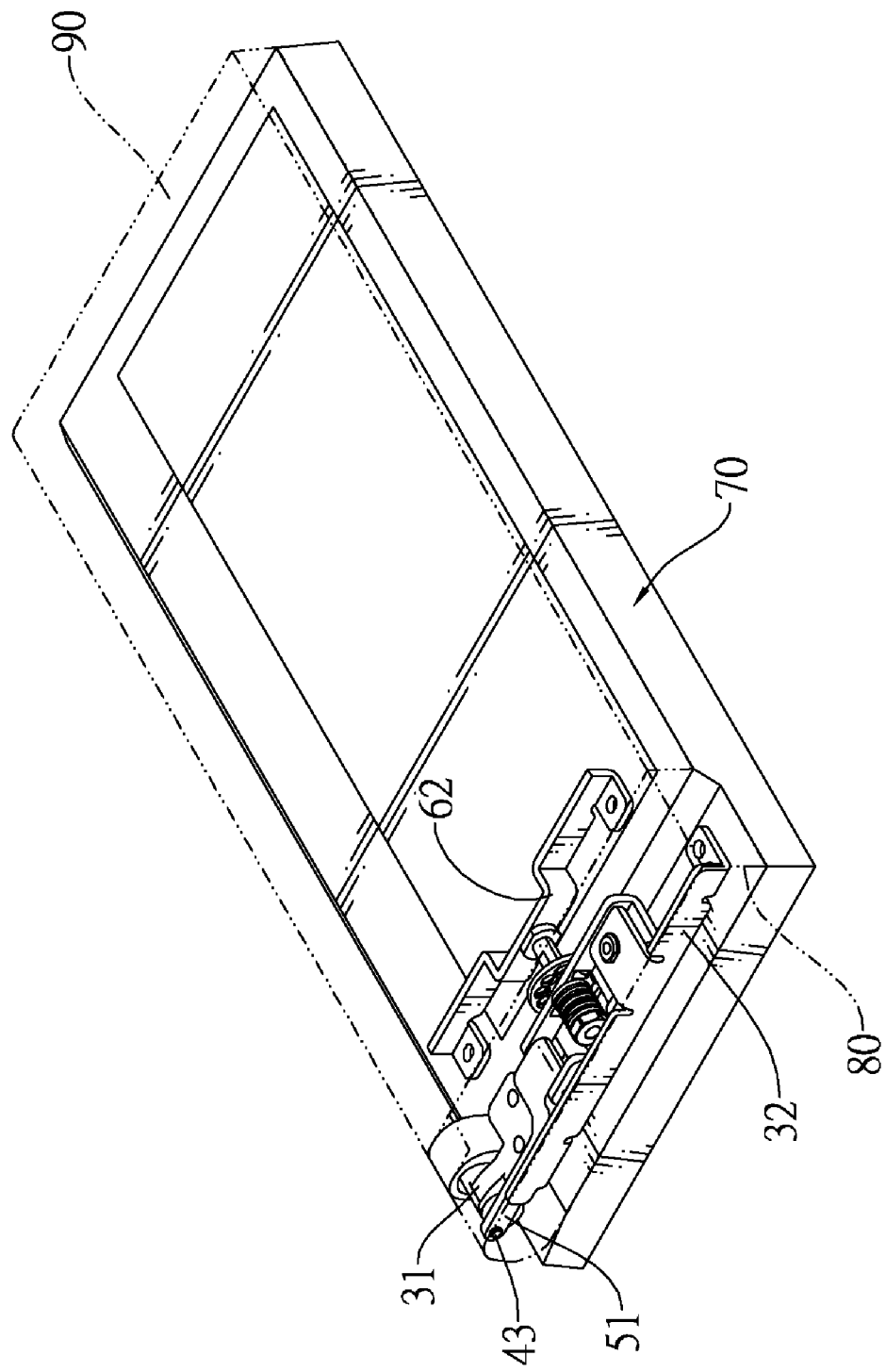
FIG. 4 is a perspective view of a portable electronic device in accordance with the present invention, with the inverted-type hinge in FIG. 1 and a cover shown in phantom lines.

With reference to FIG. 4, a portable electronic device in accordance with the present invention comprises the inverted-type hinge as described, a base (70), a side shell (80) and a cover (90). The stationary bracket (10) is attached securely to the base (70). The side shell (80) is attached securely to the tilting bracket (32). The cover (90) is attached securely to the inverting bracket (62) and has a display (91). When the cover (90) and the side shell (80) are pivoted relative to the base (70), the inverting bracket (62) drives the tilting bracket (32) to pivot relative to the stationary bracket (10) and the tilting shaft (20). Then the connecting bracket (51) and the sliding bracket (52) are pushed by the tilting bracket (32) and are pivoted relative to the limiting washer (40).

Figure 5:
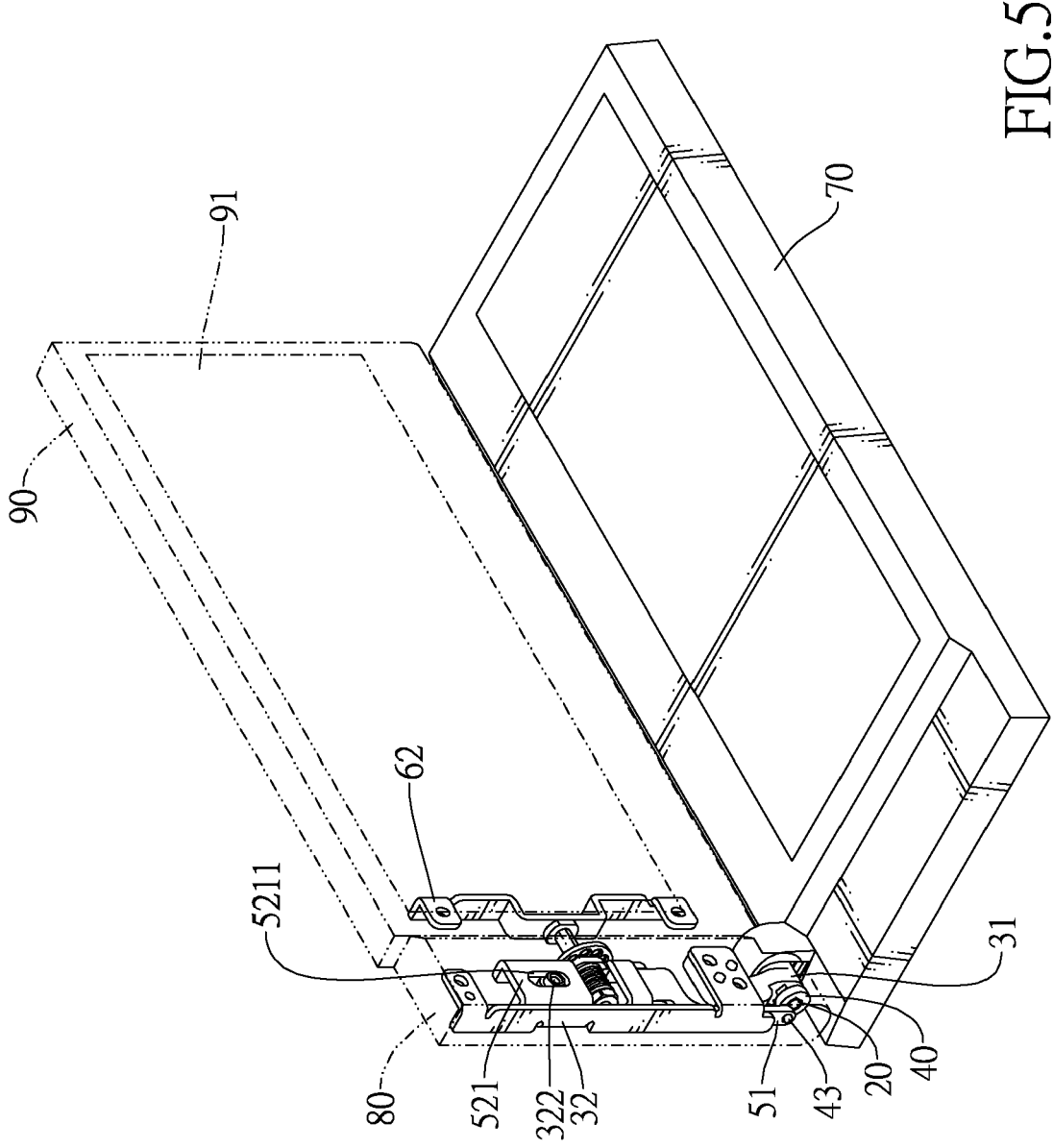
FIG. 5 is an operational perspective view of a portable electronic device in FIG. 4, shown the cover pivoted.
Figure 6:
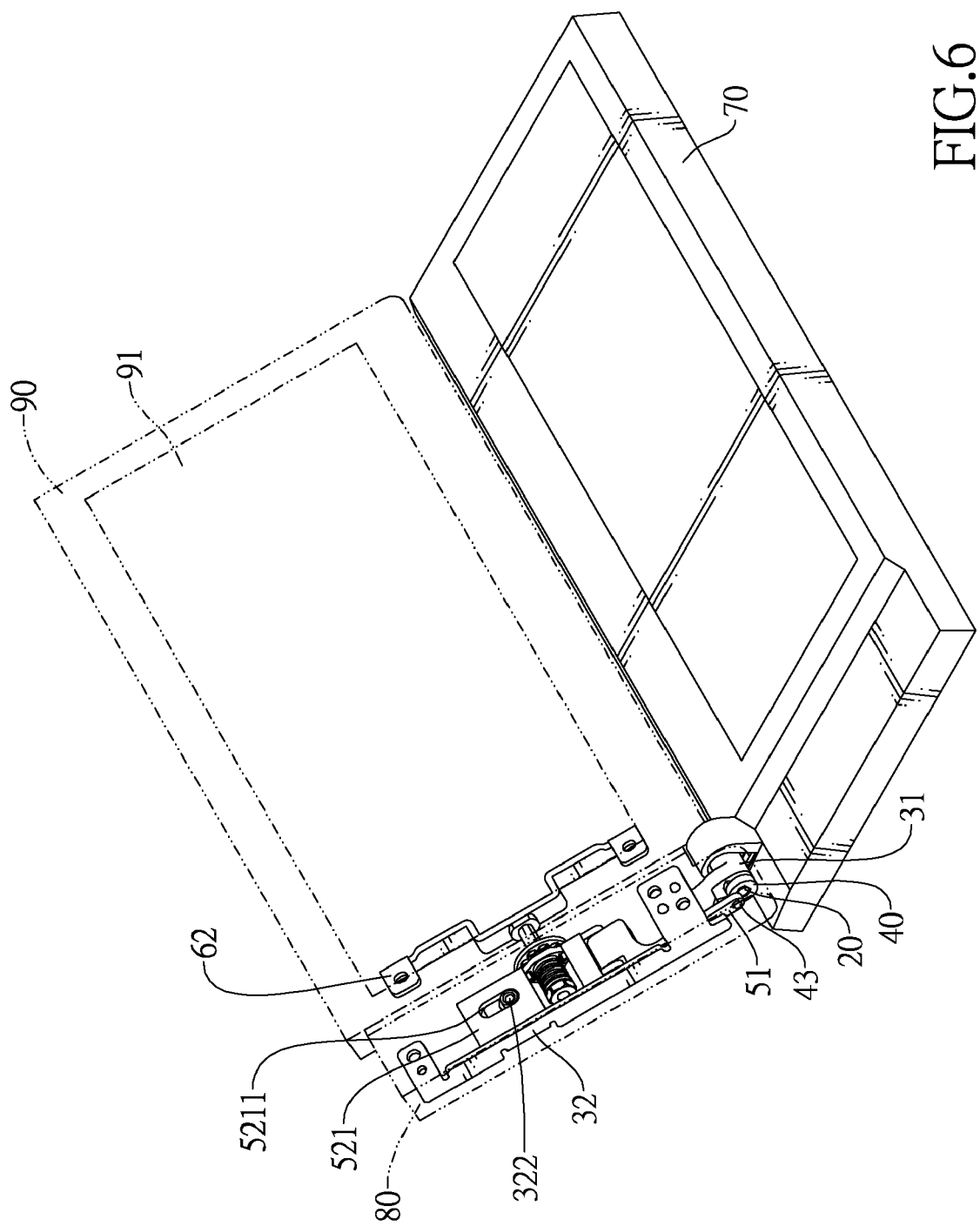
FIG. 6 is an operational perspective view of a portable electronic device in FIG. 4, shown the cover pivoted and fully lifted.

With reference to FIGS. 5 and 6, when the cover (90) is opened relative to the base (70), the tilting sleeve (31) is rotated around the tilting shaft (20) while the connecting bracket (51) is rotated around the connecting protrusion (43). Since the connecting protrusion (43) is eccentric to the tilting shaft (20), the sliding bracket (52) is rotated by the connecting bracket (51) at a different track to the tilting sleeve (31). Then the connecting bracket (51) drives the sliding bracket (52) to move upward and the elongated slot (5211) slides relative to the sliding pin (322). Therefore, the sliding bracket (52) drives the inverting bracket (62) to move upward, and the cover (90) is lifted to be away from the base (70) to keep the cover (90) from impacting the base (70).

Figure 7:
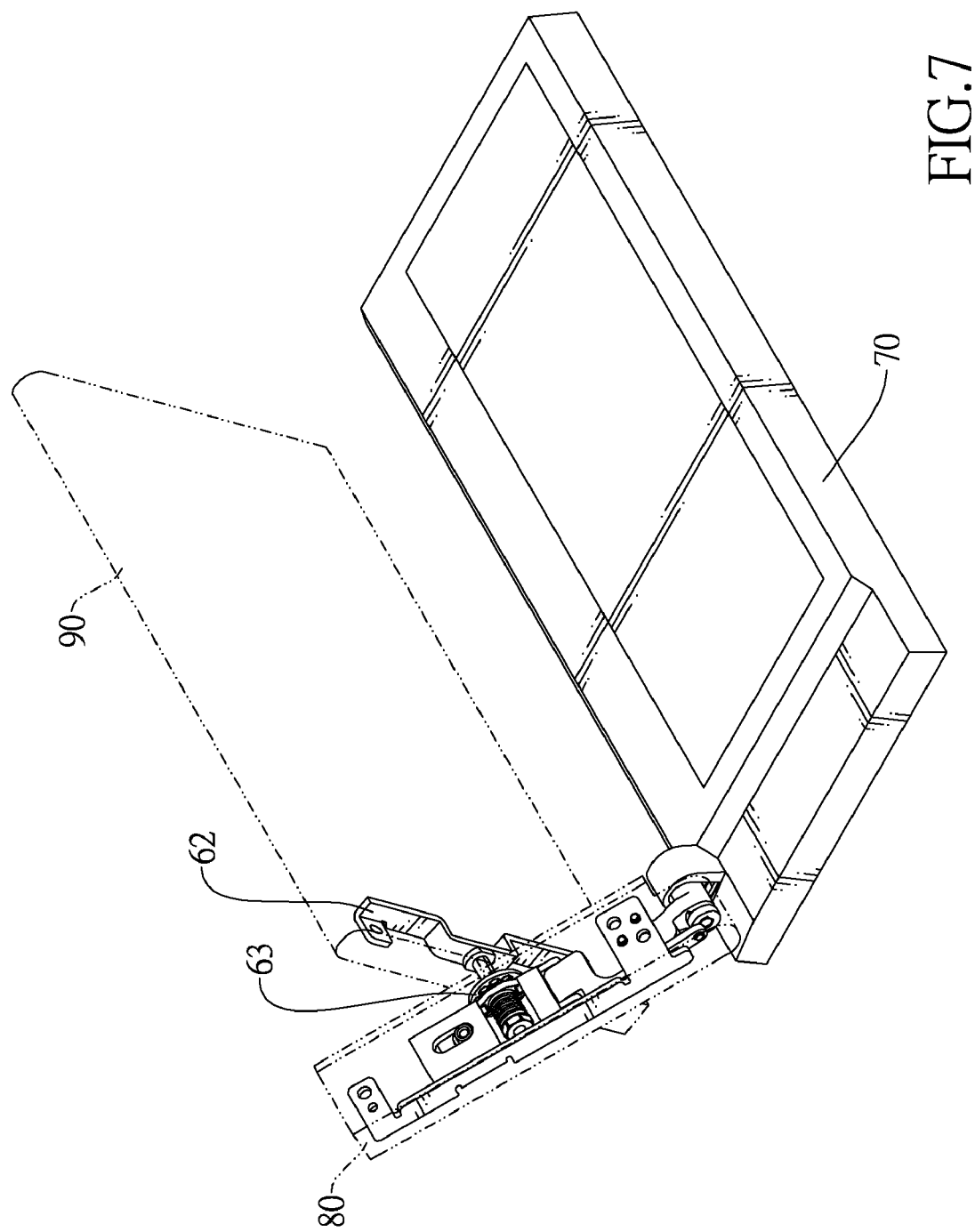
FIG. 7 is an operational perspective view of a portable electronic device in FIG. 4, shown with the cover turned.
Figure 8:
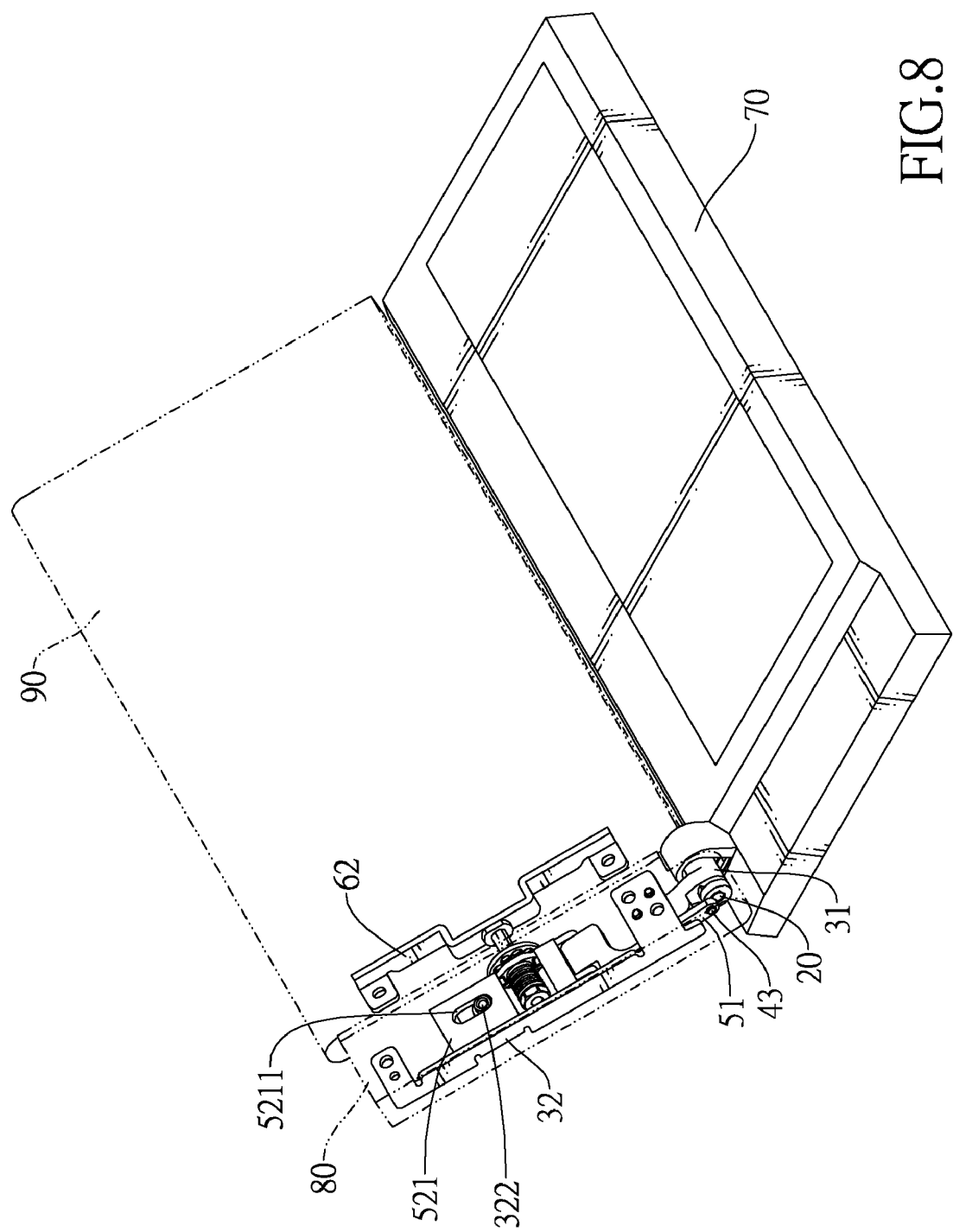
FIG. 8 is an operational perspective view of a portable electronic device in FIG. 4, shown with the cover inverted.

With reference to FIGS. 7 and 8, when the cover (90) is turned relative to the side shell (80), the inverting bracket (62) drives the inverting shaft (61) and the positioning washer (63) to turn relative to the sliding assembly (50). Engagement between the resilient protrusions (5222) and the positioning detents (631) forces the cover (90) to stop at predetermined positions so that the cover (90) is not over-rotated.

Figure 9:
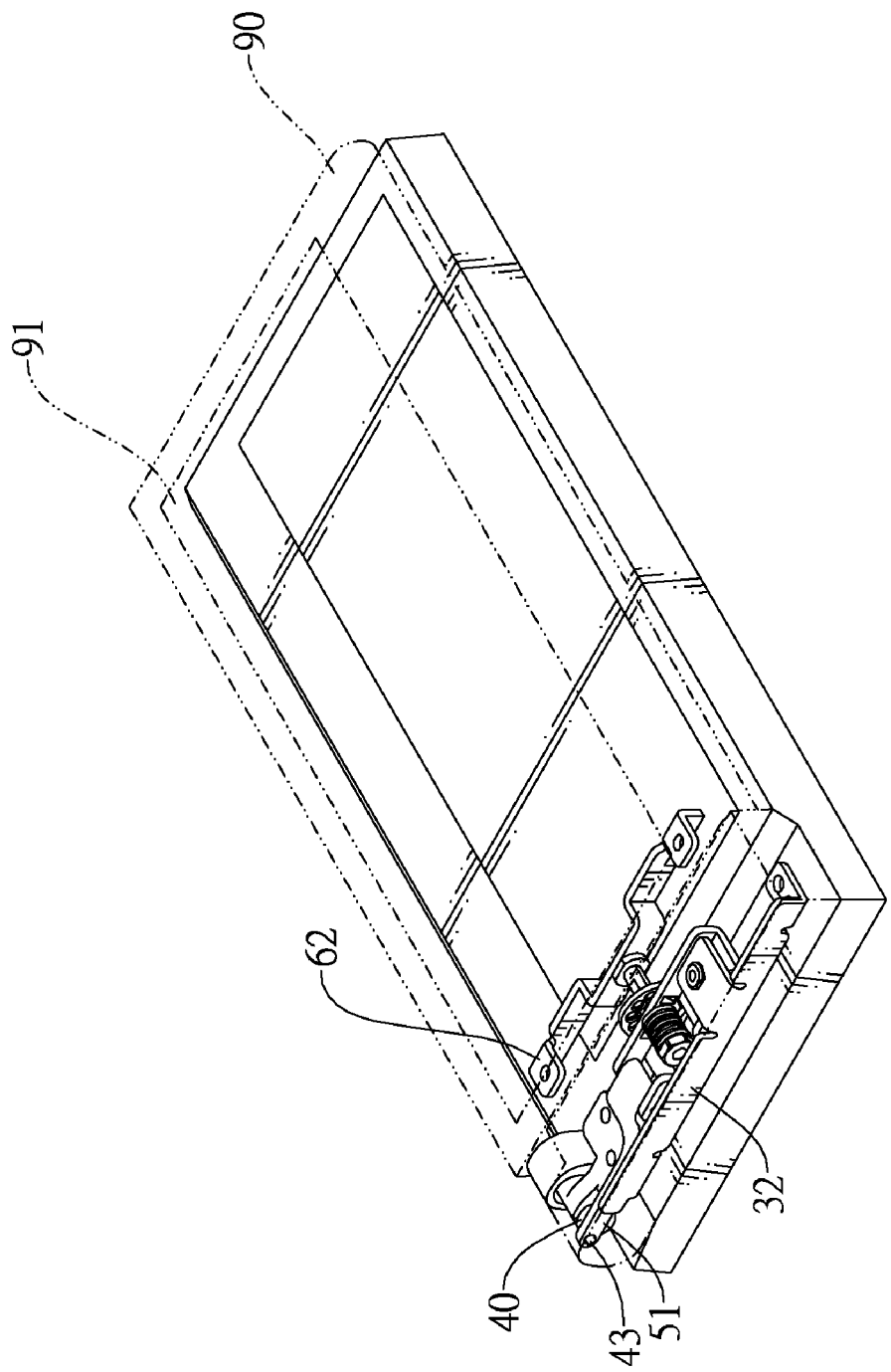
FIG. 9 is an operational perspective view of a portable electronic device in FIG. 4, shown with the cover inverted and closed relative to the base.

With reference to FIG. 9, the inverted cover (90) is closed relative to the base (70) to reveal the display (91). The sliding bracket (52) slides relatively downward to return to the original height so that the cover (90) leans against the base (70).

The inverted-type hinge and the portable electronic device as described have following advantages. With cooperation between the inverting assembly (60) and the tilting assembly (30), the cover (90) may be inverted relative to the side shell (80) and leans against the base (70) so that the user can easily press the display (91) without pivoting the cover (90). Furthermore, the sliding assembly (50) lifts the cover (90) to prevent the cover (90) from impacting the base (70) during pivoting.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An inverted-type hinge comprising:
   a stationary bracket;
   a tilting shaft mounted securely through the stationary bracket;
   a tilting assembly connected to the tilting shaft and having
      a tilting sleeve mounted rotatably around the tilting shaft;
      a tilting bracket connected securely to the tilting sleeve; and
      a sliding pin attached securely to the tilting bracket;
   a limiting washer mounted securely around the tilting shaft and having
      a connecting protrusion formed longitudinally on and protruding from a distal side of the limiting washer and being eccentric to the tilting shaft;
   a sliding assembly connected to the limiting washer and having
      a connecting bracket abutting the tilting bracket and having
         a connecting end mounted rotatably around the connecting protrusion of the limiting washer; and
         a mounting end; and
      a sliding bracket attached securely to the mounting end of the connecting bracket and having
         a sliding wing having an elongated slot mounted slidably around the sliding pin so that the sliding wing is movable up and down relative to the tilting bracket; and
         a mounting wing connected to the sliding wing and having a through hole; and
   an inverting assembly connected to the mounting wing of the sliding assembly and comprising
      an inverting shaft mounted rotatably through the through hole of the mounting wing; and
      an inverting bracket mounted securely around the inverting shaft.

2. The inverted-type hinge as claimed in claim 1, wherein the tilting sleeve has a limit formed longitudinally on and protruding from a distal end of the tilting sleeve; and
the limiting washer has a stop formed longitudinally on and protruding from a proximal side of the limiting washer and selectively abutting the limit of the tilting sleeve.

3. The inverted-type hinge as claimed in claim 1, wherein the mounting wing of the sliding bracket has two resilient protrusions opposite to each other, protruding out from the mounting wing and formed adjacent to the through hole of the mounting wing; and
the inverting assembly has a positioning washer mounted around and rotated simultaneously with the inverting shaft, mounted adjacent to the resilient protrusions of the mounting wing and having
   multiple positioning detents selectively engaging the resilient protrusions of the mounting wing.

4. The inverted-type hinge as claimed in claim 2, wherein the mounting wing of the sliding bracket has two resilient protrusions opposite to each other, protruding out from the mounting wing and formed adjacent to the through hole of the mounting wing; and
the inverting assembly has a positioning washer mounted around and rotated simultaneously with the inverting shaft, mounted adjacent to the resilient protrusions of the mounting wing and having
   multiple positioning detents selectively engaging the resilient protrusions of the mounting wing.

5. The inverted-type hinge as claimed in claim 3, wherein the inverting assembly has a washer assembly mounted around the inverting shaft.

6. The inverted-type hinge as claimed in claim 4, wherein the inverting assembly has a washer assembly mounted around the inverting shaft.

7. The inverted-type hinge as claimed in claim 1, wherein
the tilting shaft has a non-circular end; and
the limiting washer has a central hole engaging the non-circular end of the tilting shaft.

8. A portable electronic device with an inverted hinge as claimed in claim 1 comprising:
a base attached securely to the stationary bracket;
a side shell attached securely to the tilting bracket; and
a cover attached securely to the inverting bracket and having a display.

9. The portable electronic device as claimed in claim 8, wherein
the tilting sleeve has a limit formed longitudinally on and protruding from a distal end of the tilting sleeve; and
the limiting washer has a stop formed longitudinally on and protruding from a proximal side of the limiting washer and selectively abutting the limit of the tilting sleeve.

10. The portable electronic device as claimed in claim 8, wherein
the mounting wing of the sliding bracket has two resilient protrusions opposite to each other, protruding out from the mounting wing and formed adjacent to the through hole of the mounting wing; and
the inverting assembly has a positioning washer mounted around and rotated simultaneously with the inverting shaft, mounted adjacent to the resilient protrusions of the mounting wing and having
multiple positioning detents selectively engaging the resilient protrusions of the mounting wing.

11. The portable electronic device as claimed in claim 9, wherein
the mounting wing of the sliding bracket has two resilient protrusions opposite to each other, protruding out from the mounting wing and formed adjacent to the through hole of the mounting wing; and
the inverting assembly has a positioning washer mounted around and rotated simultaneously with the inverting shaft, mounted adjacent to the resilient protrusions of the mounting wing and having
multiple positioning detents selectively engaging the resilient protrusions of the mounting wing.

12. The portable electronic device as claimed in claim 10, wherein the inverting assembly has a washer assembly mounted around the inverting shaft.

13. The portable electronic device as claimed in claim 11, wherein the inverting assembly has a washer assembly mounted around the inverting shaft.

14. The portable electronic device as claimed in claim 8, wherein
the tilting shaft has a non-circular end; and
the limiting washer has a central hole engaging the non-circular end of the tilting shaft.

* * * * *